(No Model.) 3 Sheets—Sheet 1.
J. D. NIX.
ADJUSTABLE REEL FOR HARVESTERS AND MOWING MACHINES.
No. 290,792. Patented Dec. 25, 1883.
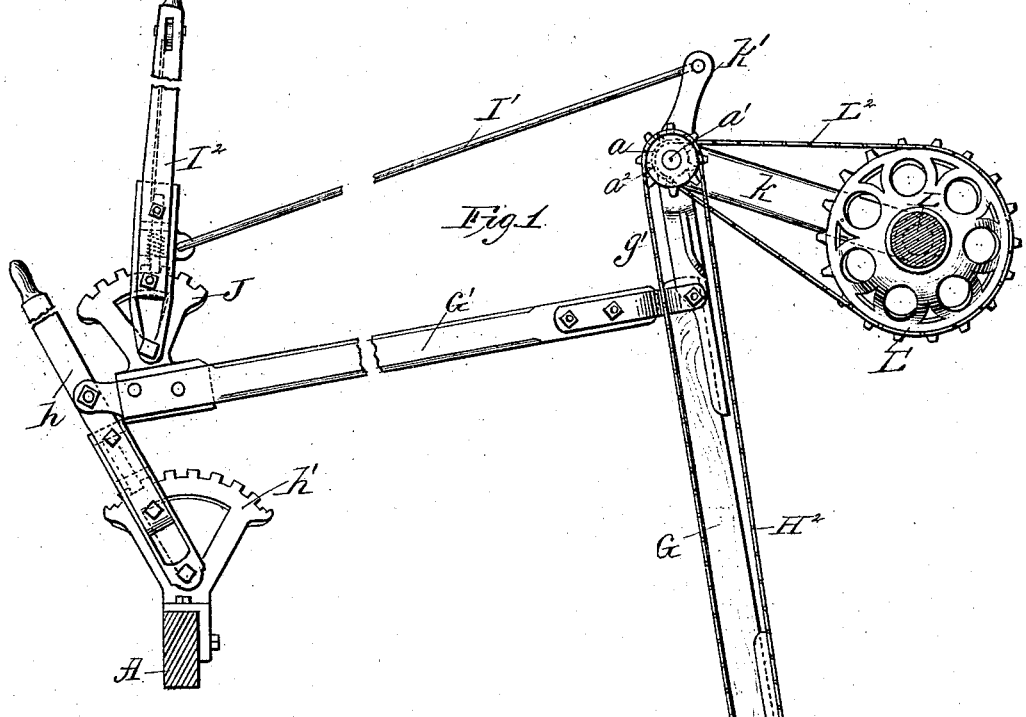
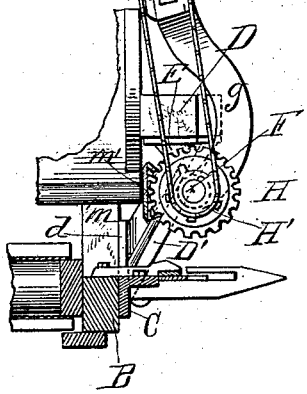
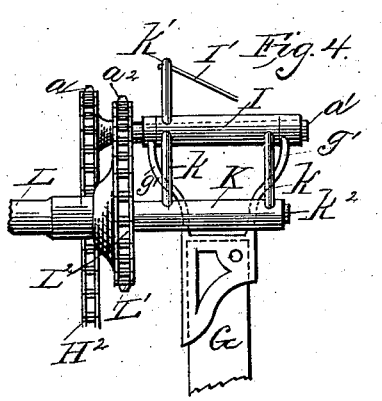
Witnesses:
E. G. Asmus
Carl Pickhardt
Inventor:
John D. Nix.
By
Stout & Underwood
Attorneys.

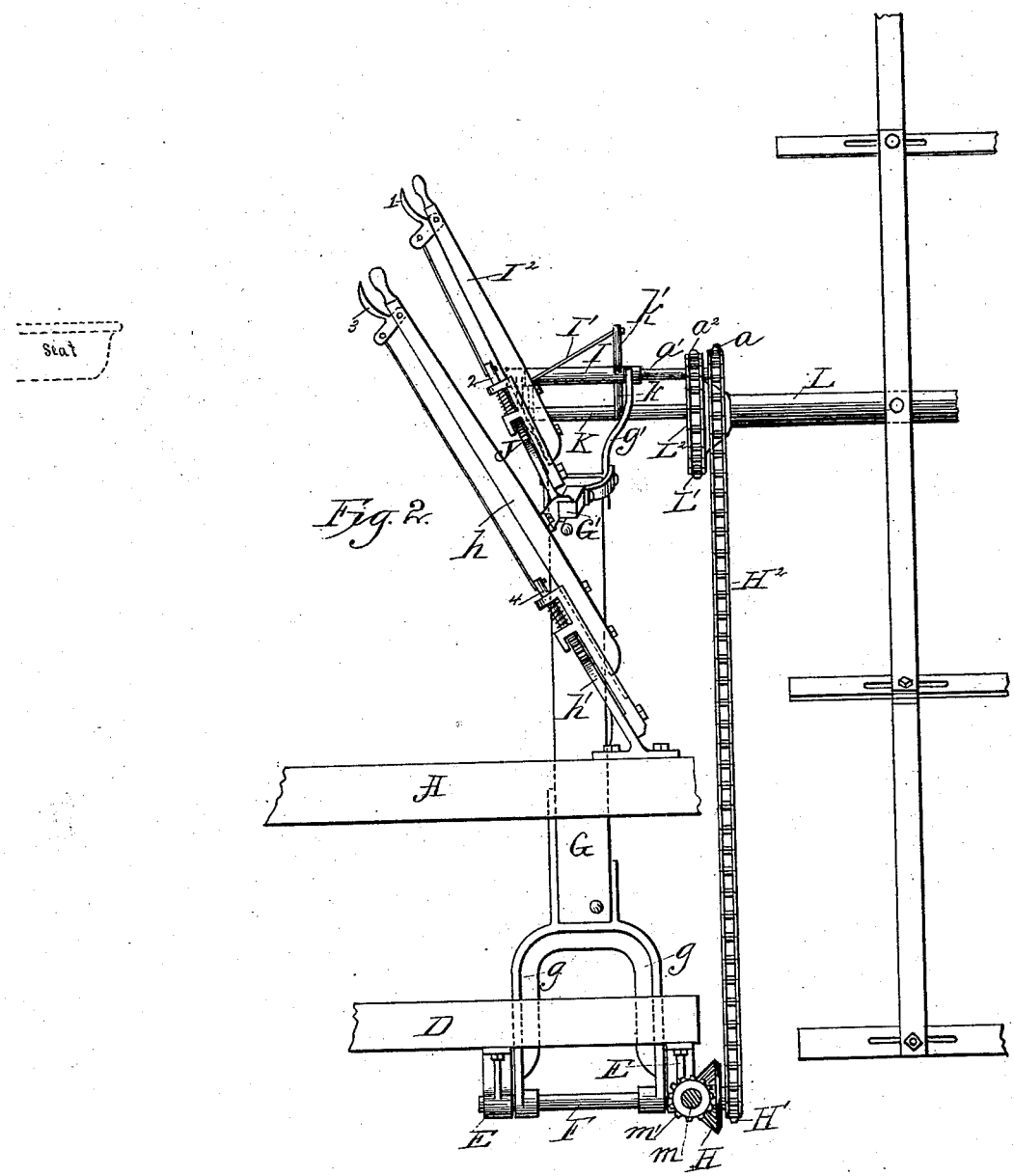

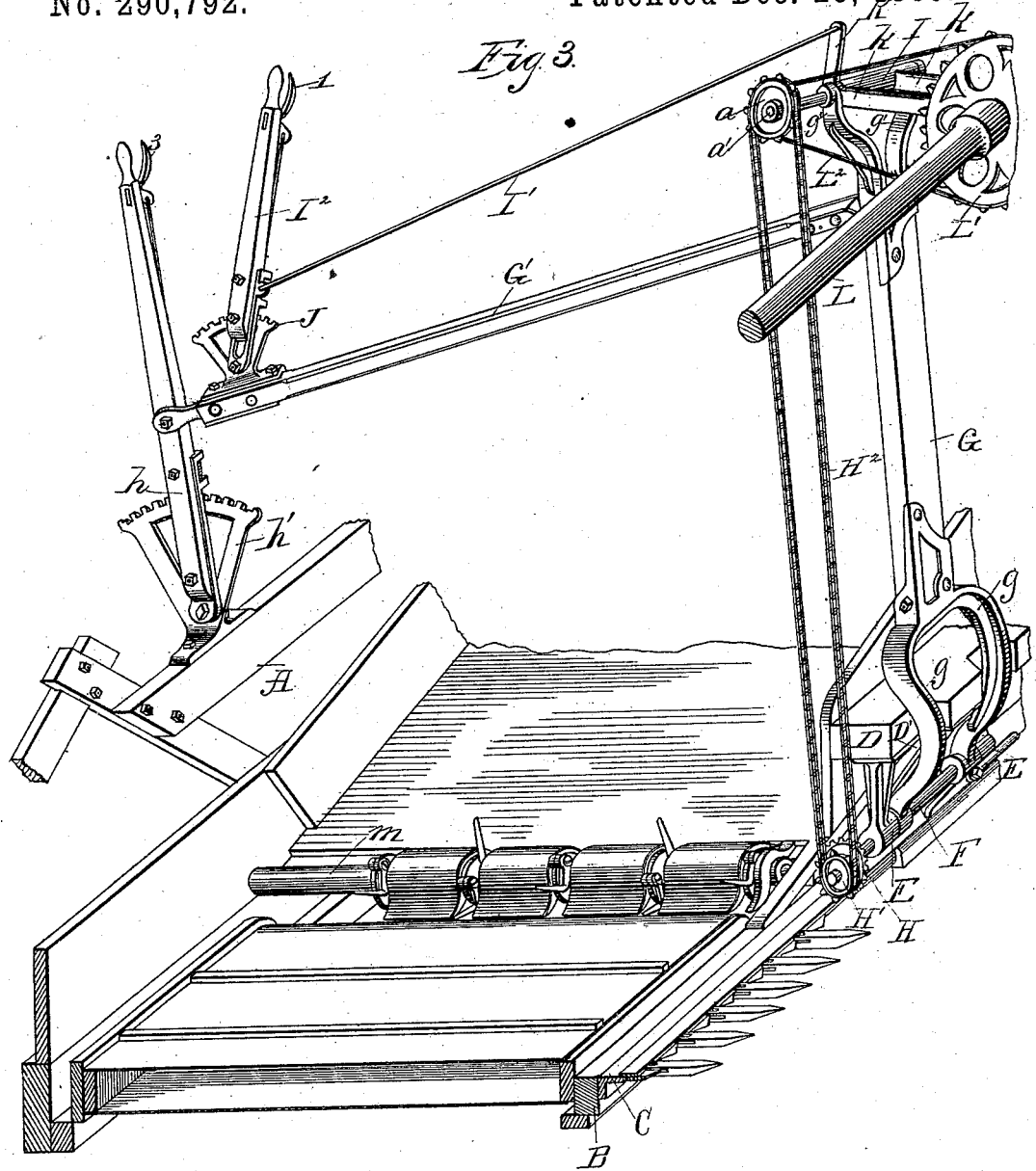

UNITED STATES PATENT OFFICE.

JOHN D. NIX, OF MILWAUKEE, WISCONSIN.

ADJUSTABLE REEL FOR HARVESTERS AND MOWING-MACHINES.

SPECIFICATION forming part of Letters Patent No. 290,792, dated December 25, 1883.

Application filed August 16, 1882. (No model.)

*To all whom it may concern:*

Be it known that I, JOHN D. NIX, of Milwaukee, in the county of Milwaukee, and in the State of Wisconsin, have invented certain new and useful Improvements in Adjustable Reels for Harvesting and Mowing Machines; and I do hereby declare that the following is a full, clear, and exact description thereof.

My invention relates to harvesting and mowing machines; and it consists in certain devices for adjusting the reel to suit the character of the grain encountered by the harvester in its passage through it, all as will be fully described hereinafter.
In the drawings, Figure 1 is a side view of my invention; Fig. 2, a rear elevation, parts broken away. Fig. 3 is a perspective view of my device and a portion of the platform of a harvester, and Fig. 4 is a detail.
A is one of the side beams of the frame of a harvester, and B is the sill to which the finger-bar C is secured.

D is a beam that is supported at one end by a bracket, D', the base $d$ of which is bolted to the sill B. From beam D, I suspend hangers E E, which form bearings for a shaft, F, which passes therethrough and forms a support for the arms $g$ $g$ of a standard, G. The shaft F also carries a bevel-wheel, H, and sprocket-wheel H'. The bevel-wheel H is designed to engage with a like bevel-wheel, $m'$, on the shaft $m$ of the carrier which conveys the grain from the platform to the binder-table, and this carrier-shaft, by revolving shaft F, through its bevel-wheel, causes the sprocket-wheel H' to revolve, and this wheel is belted to a sprocket-wheel, $a$, on a shaft, $a'$, which has its bearings in arms $g'$ $g'$ of the standard G. This shaft $a'$ carries another, but slightly smaller, sprocket-wheel, $a^2$, and also forms a support between the arms $g'$ for a sleeve, I, from which project two arms, $k$ $k$, these arms $k$ $k$ extending at right angles to the axis of the sleeve I, and in turn carrying another sleeve, K, which latter forms the bearing for the journal $k^2$ of the reel-shaft L. A large sprocket-wheel, L', is keyed to the reel-shaft L, just inside of the inner arm, $k$, and is belted to the sprocket-wheel $a^2$ by a chain, L². The sleeve I has besides the arms $k$ $k$ another arm, $k'$, and this arm is connected by a rod, I', with a locking-lever, I², which is pivoted to the base of a cog-segment, J. A bar, G', forms the support for segment J, and this bar G' is pivoted at one end to the standard G and at the other end to a locking-lever, $h$, suitable metal straps forming arms by which the pivotal connections are made. The locking-lever $h$ is pivoted to the base of a cog-segment, $h'$, and this segment is bolted to the beam A. $m$ is the shaft which communicates power from the other side of the machine, through its bevel-wheel $m'$, to the bevel-wheel H, that, through the shaft F, revolves the sprocket-wheel H', and then this sprocket-wheel H', through chain or belt H², revolves sprocket-wheel $a$ to turn shaft $a'$, and its motion will be communicated to sprocket L' by the chain L², and thus the reel will revolve in time with the rest of the machinery of the harvester.

The object of my invention is to place the reel under the entire control of the driver, and hence the segments J $h'$ are inclined from the flanges, by which they are secured to their respective supports, (see Fig. 2,) so that the levers I² and $h$ may lean toward the driver's seat, and within reach of the driver, who, when the grain is low, causes the reel to drop by unlocking lever I², and when higher grain is reached he draws upon lever I², and this, through rod I' and arm $k'$, will revolve the sleeve I on the shaft $a'$, and consequently lift arms $k$, and when the right adjustment is reached, either for low or high grain, the grasp of the hand upon latch 1, that has lifted the bolt 2 out of engagement with the cogs on segment J, is released, and the bolt 2, engaging between two of the cogs, will secure the lever I² in position.

To provide for cutting grain that leans away from the machine, it is necessary to throw the reel forward, so that its beaters may take in under the heads of the grain, and therefore the standard G is hinged at its lower end, just behind the heel of the sickle-bar, and may be tilted forward, so as to carry the reel forward of the machine, at the will of the driver, and as the axis upon which the arms of the standard G swing is situated very near the base of the machine, the standard may have a sufficient range of motion to carry the reel out the necessary distance without dropping it appreciably below any level it may be adjusted at.

The bar G' is operated by the locking-lever $h$ in the same manner that rod I' is operated by locking-lever I², lever $h$ having a latch, 3, which is connected to a spring-bolt, 4, which in turn engages with the cogs on a segment $h'$.

The shaft L of the reel has only one journal, and this, having a long bearing, $k^2$, in sleeve K, sustains the entire weight of the reel.

Although I have incidentally shown in Fig. 3 a grain carrier and conveyer of peculiar construction, this forms no part of my present invention, but constitutes the subject of a separate application executed on even date herewith.

What I claim as my invention, and desire to secure by Letters Patent, is—

1. The sill B, to which the finger-bar is secured, the beam D, supported therefrom by a bracket, the hangers attached to said beam, the shaft F, supported by said hangers, and the reel-carrying standard G, supported on said shaft, all in combination, as described, whereby the foot of the reel-standard is pivoted near the heel of the sickle-bar, as set forth.

2. The beam D, supported as described, the hangers E E, supported on said beam, the shaft F, supported in said hangers, the reel-standard G, carried by said shaft F, as described, the shaft $a'$ and connecting mechanism to propel the reel, the sprocket-wheels and chain, by which motion is communicated from shaft F to shaft $a'$, and driving-gear, substantially as described, for propelling shaft F, all the elements in combination, as and for the purpose specified.

3. The shaft $a'$, supported on standard G, and driven by sprocket-wheel, as described, the sleeve I on said shaft, having arms $k$ $k$, which support the bearing K of the reel-shaft, and having arm $k'$ at right angles thereto, the draw-rod connected to said arm $k'$, and the lever I², connected to said draw-rod, and a catch by which said lever may be locked to segment J, all in combination, substantially as stated.

4. The combination of the reel-supporting standard, pivoted near the heel of the cutter-bar, the bar G', pivoted thereto and connected to lever $h$, and the reel-elevating mechanism, substantially as described, connected to lever I², mounted on bar G', together with suitable locking mechanism for the levers $h$ I², all arranged to operate substantially as described.

In testimony that I claim the foregoing I have hereunto set my hand, on this 24th day of June, 1882, in the presence of two witnesses.

JOHN D. NIX.

Witnesses:
HAROLD G. UNDERWOOD,
CARL PICKHARDT.